Aug. 31, 1965   G. BURKHARDT ETAL   3,203,534
CONVEYOR
Filed Aug. 30, 1961

INVENTORS
Gisbert Burkhardt &
Hans Rapparlie

BY
ATTORNEY

United States Patent Office 3,203,534
Patented Aug. 31, 1965

3,203,534
CONVEYOR
Gisbert Burkhardt and Hans Rapparlie, Konstanz, Germany, assignors to Telefunken Patentverwertungs-G.m.b.H., Ulm (Danube), Germany
Filed Aug. 30, 1961, Ser. No. 134,900
Claims priority, application Germany, Sept. 1, 1960,
T 18,944
3 Claims. (Cl. 198—165)

The present invention relates generally to conveyors, and more particularly to conveyors which align shipments being processed by automatic sorting machines, and the like.

In automatic sorting machines, material to be sorted, such as mail shipments or forms, is usually conveyed in an upright position between conveyor belts or rollers. The individual shipments must be aligned relative to a conveying path. Normally, one longitudinal edge of the shipments is aligned in the direction of conveying. The shipments must be aligned at several locations since proper alignment is frequently disturbed.

There have been prior proposals to provide aligning means including the provision of inclined rollers which force the shipments against an element having a reference plane. In such devices, the shipments are subjected to great mechanical stress. It is more advantageous to use aligning means in which the shipments are aligned with one edge along a horizontal reference plane by the force of gravity. The aligned disposition of the shipments is disturbed during handling in an automatic sorting machine, and especially by rotating or turning devices. The bottom edges of the respective shipments are at different distances from the reference plane of the aligning means and, furthermore, these bottom edges may even be inclined with respect to the direction of conveying and the reference plane. Such misaligned shipments must be aligned by an aligning means.

Due to inertia or some type of conveying means, the shipments are delivered to aligning means defining an aligning path. The shipments in this path are aligned along a horizontal reference plane by the force of gravity. Since the shipments would be braked or stopped too quickly by contact with the element defining the reference plane and the side walls, a conveyor belt is arranged in the conveying path for supporting the bottom edges of the shipments and which, at the same time, serves as a horizontal reference plane. The side walls may be stationary. However, in this case there is still a considerable braking force exerted upon the shipments. To eliminate this, guide belts moving in the conveying direction are used for lateral guiding of the shipments. The distance between the guide belts is sufficiently large that even thick shipments may freely pass between the guide belts. When these guide belts are used, the braking effect upon the shipments is eliminated. The guide belts generate an air cushion during their movement, along which the shipments may slide. The shipments may adhere to the guide belts due to static charges, in which event no aligning of the shipments takes place in the aligning path. If the belts are coated with an antistatic coating, charging of the belts may be decreased. However, static charging of the shipments is not thereby decreased and the shipments may still adhere to the guide belts. This is especially true with light shipments, such as post cards. The alignment of such shipments in an aligning path of the conventional type is problematic due to this charging effect.

With these defects of the prior art in mind, it is a main object of the invnetion to provide a conveyor wherein proper alignment of the shipments will consistently take place.

Another object of the invention is to provide an aligning device for aligning shipments along a shipment supporting reference plane having spaced guide belts as the side walls wherein the problem of improper alignment due to static charges and other causes is obviated.

These objects and others ancillary thereto are accomplished according to a preferred embodiment of the invention wherein guide belts are provided and are inclined with respect to the reference plane in the direction of conveying. Thus even shipments adhering to the guide belts are moved towards the reference plane and are aligned.

Additional objects and advantages of the present invention will become apparent upon consideration of the following description when taken in conjunction with the accompanying drawings in which.

Figure 1:
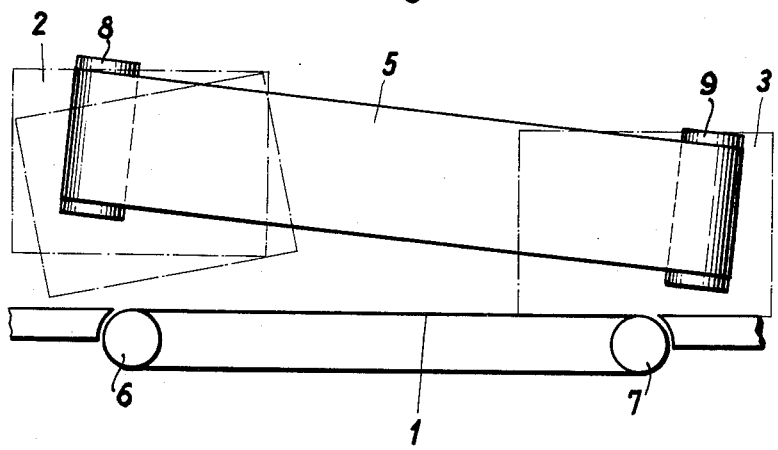
FIGURE 1 is a diagrammatic side elevational view of the aligning conveyor comprising the present invention.
Figure 2:
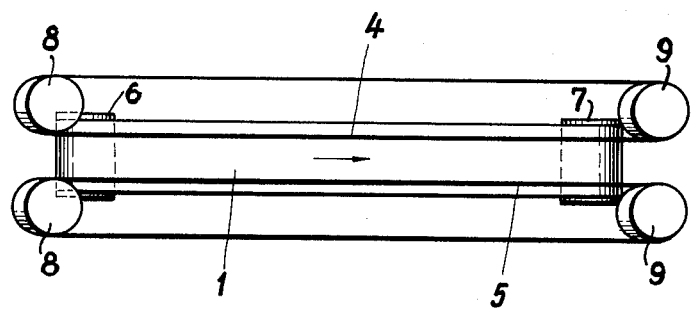
FIGURE 2 is a diagrammatic plan view of the device illustrated in FIGURE 1.

With more particular reference to the drawings, a shipment supporting conveyor belt 1 is provided which also acts as a horizontal reference plane. Conveyor belt 1 extends over rollers 6, 7. Shipment 2 to be aligned is delivered from a rotating device, for example. Proper alignment of the shipment is disturbed by such a device, as indicated by the position of shipment 2. In the aligning path, the shipments are to be aligned so that their bottom edges are supported on the conveyor belt 1, as indicated by shipment 3. Guide belts 4, 5 are arranged on both sides of the aligning path and run over rollers 8, 9. The direction of movement of the guide belts 4, 5 is inclined with respect to the reference plane (belt 1). The shipments may freely slide between the guide belts 4, 5 and may be aligned by the force of gravity along the conveyor belt 1 forming a shipment supporting floor. However, due to static charges, a shipment may adhere to one of the guide belts. This shipment is not aligned by the force of gravity along the reference plane. But, since the guide belts are obliquely disposed, the shipment is conveyed towards the reference plane by the guide belt to which it adheres. The shipment may freely slide along the guide belt so that its bottom edge remains aligned with the reference plane 1 when the shipment is brought to the reference plane by the guide belts.

Preferably, the guide belts 4, 5 run at higher speed than the conveyor belt 1. The velocity component of the guide belts in the direction of conveying is to be equal to the conveying velocity.

The design of aligning means according to the present invention considerably improves the mode of the alignment operation. Proper alignment of shipments which readily adhere to the guide belts due to static charges, is rendered possible by the instant invention.

It will be understood that the above description of the present invention is susceptible to various modifications, changes, and adaptations, and the same are intended to be comprehended within the meaning and range of equivalents of the appended claims.

What is claimed is:

1. A conveyor for aligning flat material to be sorted, such as mail shipments, comprising, in combination: a conveyor belt device for conveying shipments and defining a horizontal reference plane against which the edges of shipments are to be aligned; and spaced guide belts forming side walls for said device and moving in the conveying direction so that any shipments which do not adhere to said guide belts may align themselves solely by the force of gravity, said guide belts being inclined toward said reference plane to align any shipments which do adhere to said guide belts.

2. The conveyor of claim 1 wherein the conveying surface of said conveyor belt device forms from said reference plane.

3. In a conveyor for aligning flat material to be sorted, such as mail shipments, and having an upright conveyor belt device for conveying shipments and defining a horizontal reference plane against which the edges of shipments are to be aligned, and side walls spaced a sufficient distance apart that shipments are aligned on said reference plane by the force of gravity, the improvement comprising: guide belts defining said side walls and moving in the conveying direction and inclined towards said reference plane.

References Cited by the Examiner
UNITED STATES PATENTS

| | | | |
|---|---|---|---|
| 1,495,799 | 5/24 | Raynaud | 198—165 X |
| 2,947,406 | 8/60 | Hazelton | 198—165 X |

SAMUEL F. COLEMAN, *Primary Examiner.*

WILLIAM B. LA BORDE, SAMUEL LEVINE, ERNEST A. FALLER, JR., *Examiners.*